United States Patent [19]
Heinz

[11] Patent Number: 5,862,180
[45] Date of Patent: Jan. 19, 1999

[54] DIFFERENTIAL ENCODING OF SELF-CLOCKING DATA STREAMS

[76] Inventor: Gary L. Heinz, 3 Lilly La., San Carlos, Calif. 94070

[21] Appl. No.: 794,544

[22] Filed: Feb. 1, 1997

[51] Int. Cl.⁶ .............................. H04B 14/06; H03D 3/22; H03M 7/30
[52] U.S. Cl. .............................. 375/244; 375/330; 341/76
[58] Field of Search .................................... 375/244, 330, 375/283; 341/76, 143

[56] References Cited

U.S. PATENT DOCUMENTS

| | | | |
|---|---|---|---|
| 4,785,467 | 11/1988 | Yamada | 375/288 |
| 5,182,745 | 1/1993 | Heichler | 375/220 |
| 5,438,571 | 8/1995 | Albrecht et al. | 370/408 |
| 5,467,369 | 11/1995 | Vijeh et al. | 375/224 |
| 5,631,849 | 5/1997 | Wallace | 375/244 |

*Primary Examiner*—Temesghen Ghebretinsae
*Assistant Examiner*—Albert C. Park

[57] ABSTRACT

A method of transmitting and receiving a differential self-clocking data stream. The communications link comprises the coding of information signals onto two signal wires using two logic levels on each wire for a total of four possible coding symbols. The four symbols are utilized to encode data and control-states in both electrically differential and common mode manner upon the two signal wires. The coding sequence is chosen so as to facilitate the communications of binary data and control signals along with demarcation of each successive bit boundary by utilizing the consecutive symbol sequences which are nonrepetitive.

3 Claims, 6 Drawing Sheets

DIFFERENTIAL ENCODING OF SELF-CLOCKING DATA STREAMS

FIELD OF THE INVENTION

This invention relates to digital communications signaling and more particularly, to methods of differentially encoding and serially transmitting sequences of self-clocking binary data between communication modules.

BACKGROUND-DESCRIPTION OF PRIOR ART

In recent years, there has been an increased interest in asynchronous logic circuits. This increased interest is attributable to the fact that asynchronous logic circuits are able to operate at particularly fast speed, much faster, for example, than equivalent clocked circuits and require fewer signal interconnections. Within the communication processing arts, asynchronous logic circuits known as self-clocking have been described which encode the transmitted data sequences in ways which inherently embed clock energy within the encoded signal's frequency spectrum. This embedded clock energy is typically extracted at the receiver and used to regenerate a local copy of the synchronous data clock for sampling and processing of the received bit patterns.

Prior art such as U.S. Pat. No. 3,828,167 by Goldfarb, describes encoding techniques which vary the pulse width of a binary-1 versus that of a binary-0 in order to allow the receiver to discriminate between the two values by measuring the pulse width relative to a clock reference located at the receiver. This technique has the drawback of being slower to transmit than those that employ symmetrical bit intervals for both binary values. Other prior art, such as the IEEE 802 Local Area Network standards, employ Manchester encoding or 4B5B encoding to create self-clocking data. The latter is a technique where binary characters of some fixed bit length, are encoded into a second binary sequence, comprising a number of bits greater than that of the source characters. The larger sequence utilizes only a subset of the binary codes possible with the larger number of bits. The code subset is chosen to preserve and intensify clock frequency energy to the receiving clock recovery circuit while maintaining long term energy balance to minimize DC offset in the signal. Commercially available circuits of this type presently operate at serial data rates up to several giga-bits per second. However, there are several drawbacks to these prior art approaches. These techniques do not provide a definitive clock edge in their encoding for of every bit interval. For techniques that embed clock energy with extra bit codes, they typically suffer from the inclusion of a relatively large percentage of extra overhead bits. Clock recovery circuits utilized with these techniques often employ phase lock loop (PLL) circuits which must be implemented in some form of mixed signal technology if incorporated within an integrated circuit (IC). Such an approach usually results in increased design complexity and manufacturing expense of the receiver along with inherent restrictions on the number of simultaneous receivers in a single IC package due to crosstalk and noise sensitivity of PLL circuits within the IC.

The prior art in the data processing related applications have centered on asynchronous circuits know as self-timed circuits used for the purpose of data transfer. Some instances of prior art in self-timed circuits use a bi-directional signaling protocol, comprised of the transmit and receive circuits exchanging a request and acknowledgment signals respectively, to complete a data transfer. In the prior art of U.S. Pat. No. 5,386,585 by Traylor, a data transfer protocol is described which utilizes a data request issued by the transmitter and a Ready signal from the receiver to perform the handshaking, in much the same manner as performed in earlier asynchronous FIFO circuits. These forms of bi-directional "Request & Acknowledgment" protocols are adequate for fast communication within a single integrated circuit device because of the small physical geometry which result in short signal transit times However, these "Request & Acknowledgment" protocols do not facilitate fast communication between modules when the signal transit delay between the modules may be several nanoseconds due to the relative physical proximity between transmitter and receiver being measured in meters.

Another prior art form of asynchronous data transfer employs dual-rail transition encoding as described by a technical paper by Ebergen, Segers, and Benko entitled Parallel Program and Asynchronous Circuit Design. This paper was included as a chapter in the book titled "Asynchronous Digital Circuit Design", starting at page 59. The book was authored by Birtwistle & Davis and published in 1995. With this method, each bit is implemented using two wires, one wire for the value zero and one wire for the value one. Sending a transition along the '0' wire implements the communication of a zero, and sending a transition along the '1' wire implements the communication of a one. Each transition is non-overlapping with other pulses on the same wire or with transitions on the other wire. The requirement for non-overlapping pulses means that dead time must be inserted between pulses. This dead time reduces or limits the maximum speed of data transmission to values less than could be possible if the pulses could overlap or be adjacent.

As will be described the present invention departs from the strategy of requiring the receiver to regenerate a local copy of the data clock or deliver a data transfer acknowledgment signal. The invention also departs from the practice of adding extra bits to the data to facilitate clock recovery.

OBJECTIVES AND ADVANTAGES OF THE INVENTION

The advantages offered by a differentially encoded, self-clocking data stream include:

(a) The method does not require a PLL or clock regenerator circuit at the receiver side of the link to sample or shift the data into local storage registers. This significantly simplifies the receiver design and facilitates the possibility of including multiple receivers on a single digital integrated circuit.

(b) The method does permit the inclusion of embedded signaling information within the link for control purposes.

(c) The method employs differential electrical signaling to improve common mode noise immunity and permit or tolerate limited attenuation of the signal as observed by the receiver.

(d) In relation to item (c) reduced amplitude signals and electrically differential signals, in particular, generate reduced amounts of Electro-Magnetic Interference (EMI) to neighboring signals and the surrounding environment. In this case, the differential receivers utilized with this method permit the signal amplitude to be reduced, improving the likelihood of reduced EMI emissions.

(e) The use of a non-transmission signaling state where both signals in the pair are at a common level permits the signal pair to be shared with other drivers with simple open collector drive circuits. Other classical, electrically differential transmit and receive pairs would typically require higher complexity tri-state or isolation buffers to provide this functionality.

SUMMARY OF THE INVENTION

The present invention is a method of electrically encoding binary data bits and control semaphores onto a pair of signal lines, in a manner which enables a decoder to detect the data, semaphores, and sampling transitions using commonly available line receiver technology and logic functions.

In one aspect of the invention, the pair of signal lines, each supporting two logic levels, is encoded with up to four unique states. The state assignments are made so as to differentially encode the data bits while utilizing the two common mode patterns for a control semaphore and a state which indicates a non-transmit condition.

In another aspect of the invention the data bits are encoded with differential signals unless the prior adjacent bit value was the same as the present value. In that case one of the common mode states is inserted for the second instance of the repetitive bit value. The fourth state is comprised of common electrical levels on the signal pair and used as a control semaphore.

A third aspect of the invention deals with the receiver methods and circuits. The data is received using multiple differential receivers connected in complementary fashion so as to permit discrimination of the 4 unique signal line states. Further logic decoding is performed on the receiver outputs to derive the transmit data pattern and sampling instances. Each of the logic decoding sections is unique for the specific encoding patterns utilized.

A fundamental premise of all coding aspects discussed is that use of multiple differential receivers to detect the bit transmissions and control information on the signal pair offers an electrical method that is superior in detection robustness and is technically novel for this type of coding. Robustness against false sampling transitions is crucial in any clocked communications systems.

DESCRIPTION OF BEST MODES OF THE INVENTION

Figure 1:
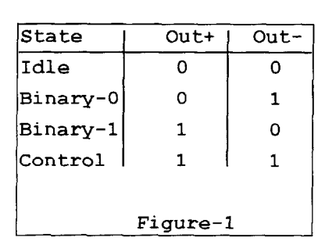
FIG. 1 is a table identifying the signal states as a function of OUT+ & OUT−.

FIG. 1 illustrates the differential encoding of the OUT+ and OUT− signals for the four possible input states.

Figure 2:
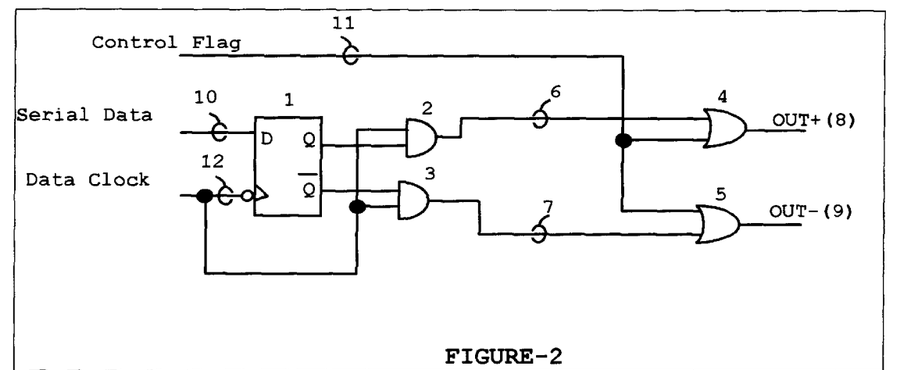
FIG. 2 is a logic schematic of the first embodiment for the invention's transmitter.

FIG. 2 illustrates one embodiment of the encoder. Serial binary data, in NRZ form, is clocked into a D-Flip Flop 1 at each bit interval. The Q and Q-Not outputs of the Flip Flop are each gated with the bit clock using AND gates 2 and 3 to generate positive pulses for their particular signal output. Since each data bit must generate a sampling pulse with a common edge polarity at the receiver (rising in this case), the total transmit bit interval will consist of a high pulse interval followed by a low pulse interval. Depending on the binary value to be transmitted, either signal 6 or signal 7 is pulsed high and then returned low in order to meet the edge generation requirement while the other signal remains low. The OR gates, 4 and 5, are used to gate signals 6 and 7 with the control flag input and permit the control flag signal to override the outputs which forces both OUT+ and OUT− signals high to indicate a control semaphore state. Therefore, for data transmission states of binary-1 or binary-0, the transmit signal pair is electrically differential during the high pulse interval, and in common mode during the low interval of a data bit period. For the state of non-bit transmission and the control semaphore state, the transmit pair is operating in common mode with both outputs low and both outputs high respectively.

Another benefit of signaling the non-transmit state with common logic levels is that other transmitters can share the pair of signal lines. In this example, if OR gates 4 and 5 were classical ECL based logic, then both outputs are at a logic low voltage of −1.8 volts for a non-transmission state. With a classical ECL design, other copies of the transmitter which are connected to the same pair of OUT+ and OUT− signals could override the low logic level to a high level of −0.8 volts, to transmit either information bits or a control semaphore. Tri-state buffers or series pass-FET isolation circuits could also be employed to permit multiple transmitters on the signal pair. However, these devices generally have slower activation times relative to the configuration described above and would potentially require longer latency times in switching transmitters on or off the signal pair.

Figure 3:
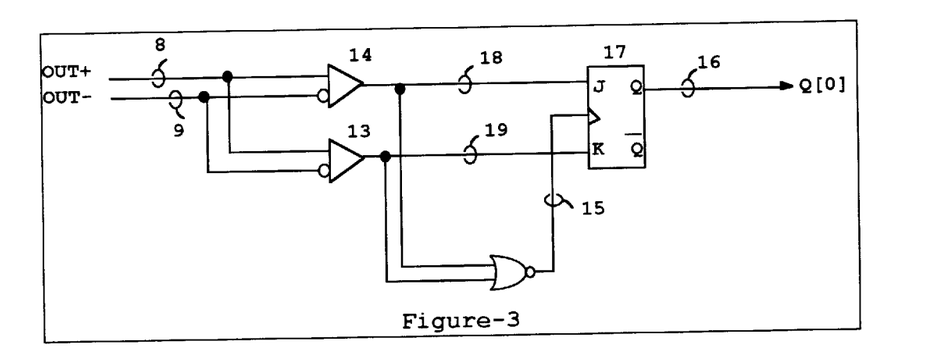
FIG. 3 is a logic schematic of the first embodiment for the invention's receiver.

The receiver circuit for the transmitter described in embodiment-1 is shown in FIG. 3. As was described in the summary section, two differential receivers, 14 and 13, are connected across signals OUT+ (8) and OUT− (9). The two differential receivers have their inverting and non-inverting inputs connected in complementary fashion with respect to each other. The differential receivers are comprised of the characteristics that if both inputs are simultaneously below the differential detection input range, the receiver's output is low. If both inputs are above the differential detection input range, the receiver's output is high. If the inputs to the receivers are differential and within the receiver's differential detection range, such that the inverting input of the receiver is more positive and the non-inverting input is more negative, then the receiver's output is low. If the inverting input of the receiver is more negative and the non-inverting input is more positive, then the receiver's output is high. With receivers having these transfer characteristics and connected in complementary fashion to the OUT+ and OUT− signals, the outputs of both receivers will be low if no data is transmitted. Both receivers will have high outputs if a data control semaphore is transmitted. One receiver output will be high while the other is low for the transmission of a binary one and the reverse will be true for the transmission of a binary zero. A rising edge is detected any time a binary one, zero, or control semaphore transition is transmitted. In FIG. 3, this edge can be on the output signals 18 or 19 of either or both receivers 14 and 13. These edges from the receiver outputs can be logically combined with the NOR gate to generate a common clock edge on signal 15, for sampling and decoding the OUT+ and OUT– signals with a JK flip flop 17. The recovered bit stream is available at Q[0] on signal 16.

Figure 8:
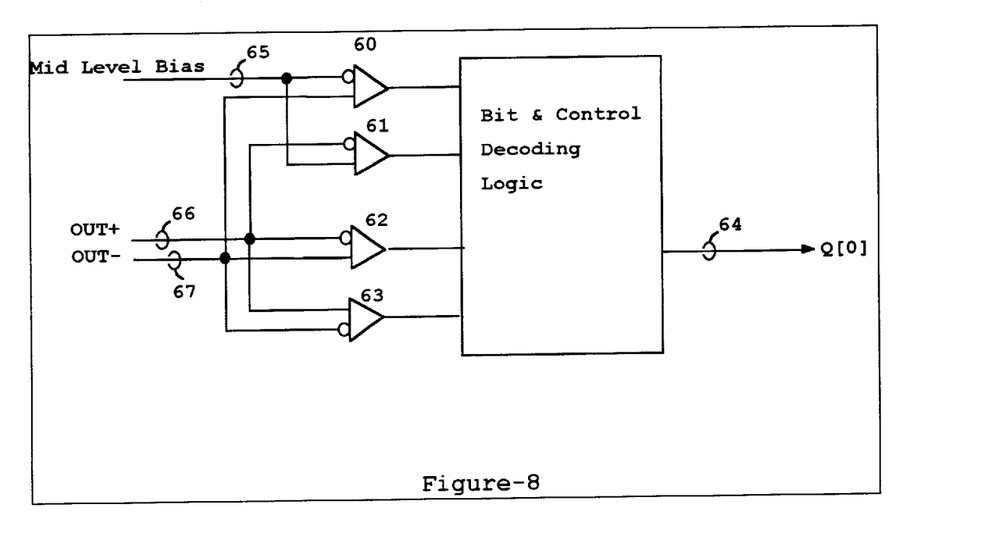
FIG. 8 is an alternative receiver front end structure to that shown in FIG. 3.

Another alternative to the use of dual receivers with the characteristics described above is to use four receivers as shown in FIG. 8. In this instance the receivers 62 and 63, connected across the OUT+ and OUT– lines in complementary fashion, will operate in differential mode over the full input signal range. The other two receivers 60 and 61, each have one input connected to the 67 and 66 signals respectively. The other inputs of receivers 60 and 61 are connected to a mid level bias voltage. These single ended receivers are operating as comparators with hysteresis and will detect input signals above and below the bias level. The logical outputs of the differential mode and common mode receivers are decoded to detect and recover the transmitted bit stream, control signals, and clock transitions. This configuration offers the advantage of allowing more signal attenuation margin at the receiver.

The advantages offered by a differential receiver in comparison to a single ended line receiver are well known in the art. These advantages include increased immunity against common mode noise coupled onto the signal lines along with increased tolerance to signal attenuation. The novelty in this instance is the use of a unique multiple differential receiver structure to recover the four transmit signal states with only two signal wires between transmitter and receiver.

Figure 4:
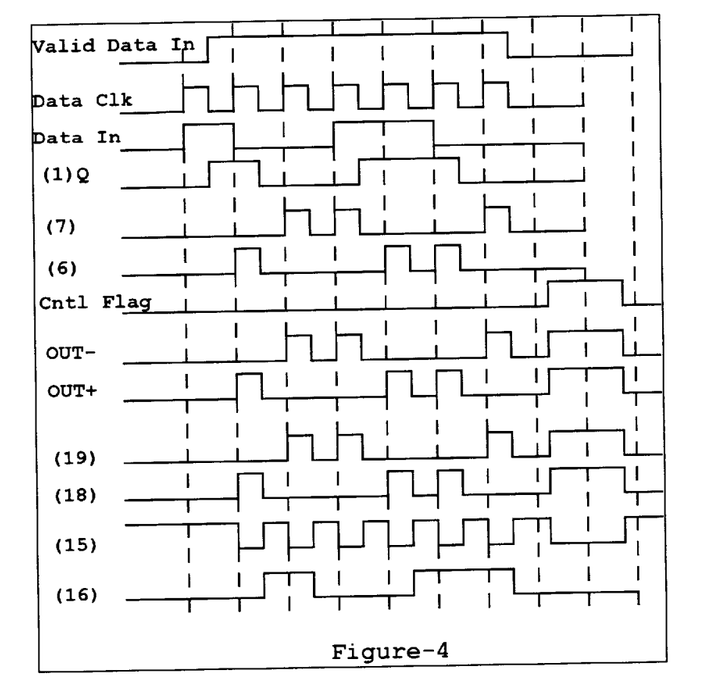
FIG. 4 is a timing diagram that illustrates the transmitter and receiver signal relationships for the circuits in FIG. 2 and FIG. 3.

FIG. 4 illustrates the timing relationships for the transmit circuit shown in FIG. 2 and receive circuit in FIG. 3. The serial transmit data is clocked into the D-Flip-Flop on the falling edge of the data clock. The high part of the clock duty cycle enables the data pulse to lines 6 and 7 while forcing both 6 and 7 low for the last half of the bit time. Since the control semaphore state is intended to be multiple bit times long in duration, it is implemented asynchronously in this embodiment. However, it can also be synchronized to the data clock signal if desired. Another point to highlight is that the data clock and serial data stream are halted during the control semaphore sequence in order to avoid loss of data when the control semaphore overrides the signals 6 and 7.

In the second embodiment, the OUT+ and OUT– signals of the transmitter are not pulsed for a fraction of a bit time as they are in dual-rail transition encoding. Rather, they are held steady in the active state for the duration of the bit interval. Since the maximum signal transfer rate is often limited by the toggle rate of the line drivers or receivers, this approach has the ability to operate at faster speeds than that of the first embodiment. However, the requirement for a clock edge transition at every bit interval remains and can not be met in the case of multiple consecutive ones or zeros being transmitted with just this approach. A further processing step is required and utilized in the form of differential bit encoding. If consecutive information bits to be transmitted are of the same value, then the respective output signal will toggle between the active state of complementary logic levels on OUT+ (37) and OUT– (38) and the state of common logic levels on both signals. In this case, the third state is chosen to be both signals at a logical_0. If no data is to be transmitted, then both the OUT+ and OUT– signals remain at the same logic level which results in no clock edge transitions and no sampling of the information decoding circuit. Validation of the common mode state can be achieved by sampling the receiver's outputs several bit intervals after the preceding clock transition ad corresponding bit transmission. This approach improves receiver robustness of the common mode signals by use of time diversity to improve the statistics against a false detection.

Figure 5:
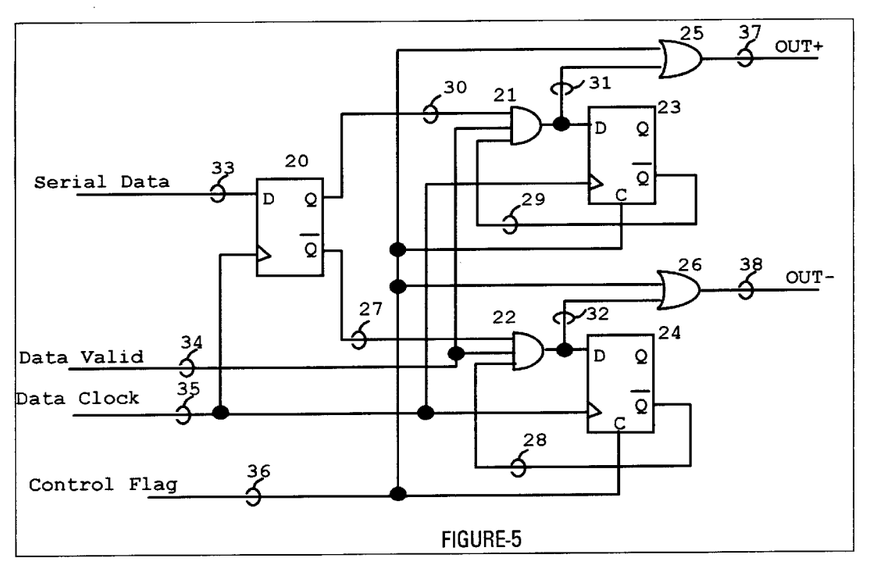
FIG. 5 shows an encoder and transmit circuitry for the second embodiment.
Figure 7:
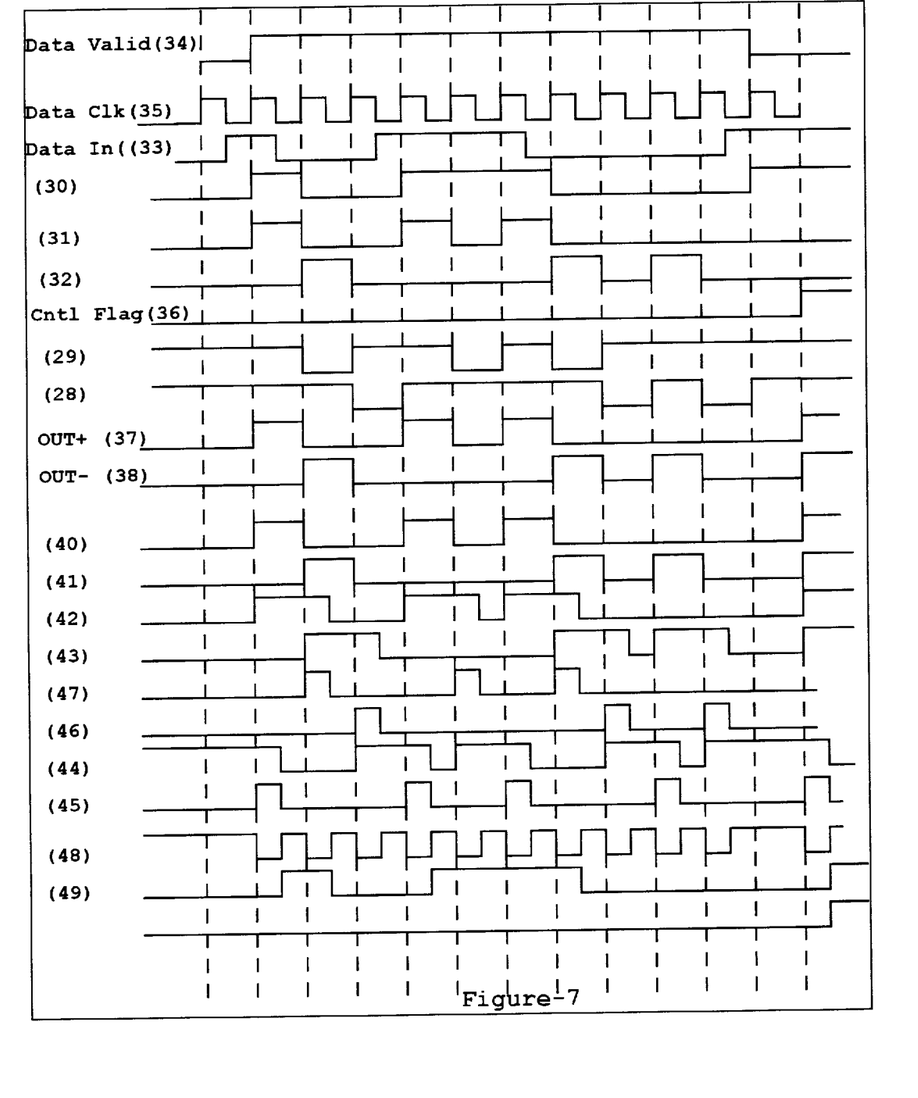
FIG. 7 is a timing diagram that illustrates the transmitter signal relationships for the differential bit type encoding.

FIG. 5 illustrates a second embodiment of the transmitter circuit while FIG. 7 illustrates the timing diagram for the transmit and receivers circuits. Serial binary data, in NRZ form, is clocked into a D-Flip Flop 20 at each bit interval. In the case of transmitting the same bit value for consecutive bit times, the corresponding OUT signal must toggle on alternate bit intervals in order to ensure edge transmissions. Therefore, Flip Flops 23 and 24 are used to sample the output of AND gates 21 and 22 each bit interval so as to provide feedback to the logic encoders of the next signal level transmitted on each of the respective output paths. These copies of previous logic levels are processed with AND gates 21 and 22 to decide if the next data bit should pass through to the desired OUT signal or be forced low. Flip Flop 23 is fed back to AND gate 21 via signal 29. Flip flop 24 is fed back to AND gate 22 via signal 28. AND gates 21 and 22 also share the common input signal, Data Valid, which is used to enable AND gates 21 and 22, when the serial input data stream contains data for transmission, and disable them when there is not valid data present or during a control semaphore state. Signal 31 is connected to OR gate 25 which provides the ability for the Control Flag signal to override the OUT+ (37) signal to a logical_1. An identical configuration is used for signal 32 to OR gate 26 which drives OUT– (38). In this embodiment alternating binary-1 and binary-0 signals will always be driven electrically differential on the OUT+ and OUT– lines as shown in the timing diagram of FIG. 7. If the data pattern has a consecutive string of the same bit value, the output will alternate every other bit time between electrically differential and common mode drive across the OUT+, OUT– signal pair as also shown in FIG. 7.

Figure 6:
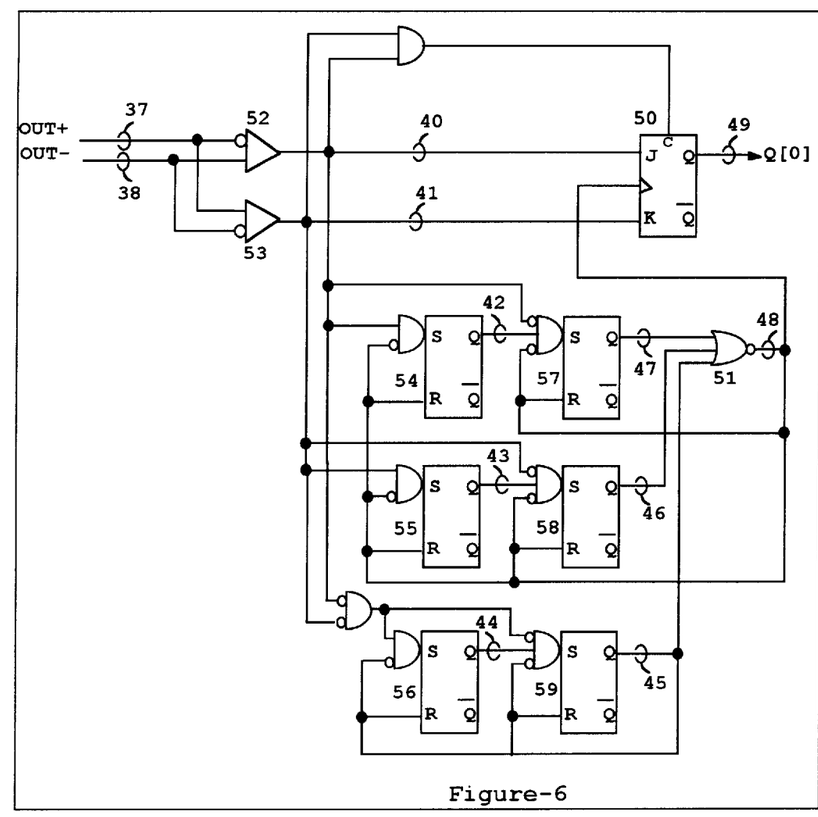
FIG. 6 shows an decoder and receiver circuitry for the second embodiment.

The receiver for embodiment-2 is shown in FIG. 6. As in the first embodiment the two differential receivers are connected to the transmit signals OUT+ (37) and OUT– (38) in complementary fashion with the same input to output characteristics as the receivers described within the first embodiment. The two signals from the receivers are used as inputs to a JK Flip Flop 50 for sampling and decoding the received data pattern. The series of RS Flip Flops below the receiver signal outputs are utilized to provide signal hold time as well as derive a sampling transition for clocking the JK Flip Flop. The combinations of RS Flip Flops 54 & 57, 55 & 58, 56 & 59 make up three Master Slave flip flop sections. The input sections decode the three potential data states of 00, 10, 01 on the receiver lines, and latch a one into the respective master RS flip flop which is decoded. When the data pattern changes to one of the other two remaining data states or the control semaphore state, the slave flip flops accept data from the master sections. The outputs of the slave sections are combined together with NOR gate 51 to create the sampling signal for the JK flip flop 50. The outputs of the slave flip flop also feeds back to the RESET inputs of the RS master flip flops to clear them once a sample edge is generated.

What is claimed is:

1. A method of transmitting and receiving sequential self-clocking binary information and control states in a serial data stream from a first communications node to one or a plurality of two or more communications nodes, including the steps of (a) encoding the binary information and control states into a pair of electrical signals where the logical encoding of each signal within the pair comprises two possible electrical levels, where said pair of electrical signals can encode up to four possible unique code symbols, (b) where the encoding symbol used to signal a binary information bit or control state is maintained unchanged for the duration of the bit transmission, and where each encoding symbol transmitted is different than the preceding and adjacent encoding symbol, (c) allocating two of said four encoding symbols such that the two symbols which are comprised of differential electrical levels on the signal pair, are utilized as a means of signaling binary information bits of one and zero, (d) allocating a third encoding symbol of said four encoding symbols which is comprised of common electrical levels on the signal pair, where said third encoding symbol is defined as a control state which is a means to indicate the start of a new message for any successive information bits which follow the control state, (e) allocating a fourth encoding symbol of said four encoding symbols which is comprised of common electrical levels on the signal pair, where the common electrical levels are the logical complement of those which encode the control symbol, and where said fourth encoding symbol is a means to indicate that the present binary information bit value on the signal pair is the same as the prior and adjacent binary information bit value which was encoded with differential electrical levels on the signal nodes.

2. The method of claim 1, further comprising the selection of electrical levels for the control symbol, such that said electrical levels permit a electrical combining means for a plurality of two or more transmitters that are connected in common with the pair of electrical signals, where said electrical combining means permits the transmission of the four encoding symbols by any one of the plurality of transmitters connected in common, while all other transmitters remain in a logical and electrical non-interfering state.

3. A method of receiving a serial stream of self-clocking binary data and control semaphores that are encoded on a pair of electrical signals as a sequence of symbols which do not repeat on an adjacent symbol basis, and that comprises the steps of (a) monitoring of the electrical signal pair with a plurality of electrically differential sensing means that are polarity dependent, where the input polarities of said plurality of electrically differential sensing means are connected to the received signal pair in a complementary fashion, where the output of first said electrically differential sensing means detects a specific binary information bit value and the second electrically differential sensing means detects the complimentary binary information bit value, (b) monitoring of the signal pair with a plurality of electrically common mode sensing means that are polarity dependent, where the input polarities of said plurality of electrically common mode sensing means are connected to the signal pair in a complementary fashion, (c) decoding one of a plurality of received common mode signal symbols as a control state, where said control state is a means to indicate the start of a new message for information symbols which follow the control state, (d) decoding one of a plurality of received common mode signal symbols as an information bit value, where said common mode input symbol is defined with common electrical levels on the received signal pair which are different than those common electrical levels which define the common mode symbol used to decode the said control states, and where said information bit value is decoded as being the same as the prior and adjacent information bit value that was decoded from the preceding electrically differential received signal symbol, (e) detecting any symbol changes in the outputs of the electrically differential sensing means and the electrically common mode sensing means as the duration boundaries of the received binary information and control symbols.

* * * * *